(12) United States Patent
Lee

(10) Patent No.: US 11,231,621 B2
(45) Date of Patent: Jan. 25, 2022

(54) DISPLAY APPARATUS INCLUDING LIGHT CONTROL MEMBER AND METHOD OF FABRICATING THE SAME

(71) Applicant: Samsung Display Co., LTD., Yongin-si (KR)

(72) Inventor: Seon Uk Lee, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/743,079

(22) Filed: Jan. 15, 2020

(65) Prior Publication Data
US 2020/0301209 A1 Sep. 24, 2020

(30) Foreign Application Priority Data

Mar. 19, 2019 (KR) .......................... 10-2019-0031352

(51) Int. Cl.
*G02F 1/13357* (2006.01)
*G02F 1/1335* (2006.01)

(52) U.S. Cl.
CPC .. *G02F 1/133621* (2013.01); *G02F 1/133603* (2013.01); *G02F 1/133605* (2013.01); *G02F 1/133606* (2013.01); *G02F 1/133607* (2021.01); *G02F 1/133612* (2021.01); *G02F 1/133614* (2021.01)

(58) Field of Classification Search
None
See application file for complete search history.

(56) References Cited

U.S. PATENT DOCUMENTS

| 10,302,845 | B2 | 5/2019 | Dubrow et al. |
| 10,718,975 | B2* | 7/2020 | Kwak ............... G02F 1/133611 |
| 10,782,000 | B2* | 9/2020 | Zhang ..................... F21V 13/14 |
| 2015/0036379 | A1* | 2/2015 | Lee ......................... G02B 6/005 362/606 |
| 2017/0199315 | A1* | 7/2017 | Yonemoto ............ G02B 6/0065 |
| 2018/0045395 | A1* | 2/2018 | Kamada ............ G02F 1/133606 |
| 2018/0292713 | A1* | 10/2018 | Drolet ..................... G02B 6/005 |
| 2019/0018286 | A1* | 1/2019 | Kim .................. G02F 1/133504 |
| 2019/0093008 | A1 | 3/2019 | Shin et al. |

(Continued)

FOREIGN PATENT DOCUMENTS

| JP | 2006-160980 A | * | 6/2006 |
| KR | 1020130120486 A | | 11/2013 |

(Continued)

*Primary Examiner* — Ryan Crockett
(74) *Attorney, Agent, or Firm* — Cantor Colburn LLP

(57) ABSTRACT

A display apparatus includes: a display panel, a light source which emits a first color light; and a light control member which receives the first color light and emits color-converted light, the light control member including: a substrate through which the color-converted light is provided to the display panel; a first light control layer which color-converts the first color light and outputs the color-converted light; a second light control layer which reflects light having a different wavelength range from a wavelength range of the first color light; and a scattering layer which scatters light incident thereto. Within the light control member, the substrate, the first light control layer, the second light control layer and the scattering layer are disposed in order in a direction from the display panel to the light source.

20 Claims, 13 Drawing Sheets

(56) References Cited

U.S. PATENT DOCUMENTS

| | | | | |
|---|---|---|---|---|
| 2019/0157354 A1* | 5/2019 | Lee | .................. | H01L 33/501 |
| 2019/0227213 A1* | 7/2019 | Li | .................. | G02F 1/1336 |
| 2019/0346113 A1* | 11/2019 | Zhang | .................. | G02F 1/133621 |
| 2020/0110309 A1* | 4/2020 | Masuda | .................. | G02F 1/13473 |
| 2020/0183224 A1* | 6/2020 | Lee | .................. | H01L 25/0753 |
| 2020/0183227 A1* | 6/2020 | Lee | .................. | G02F 1/136209 |

FOREIGN PATENT DOCUMENTS

| | | | |
|---|---|---|---|
| KR | 1020160095998 A | | 8/2016 |
| KR | 1020170119200 A | | 10/2017 |
| KR | 1020200070481 A | | 6/2020 |
| KR | 1020200070483 A | | 6/2020 |
| WO | WO 2018/194019 A1 | * | 10/2018 |

\* cited by examiner

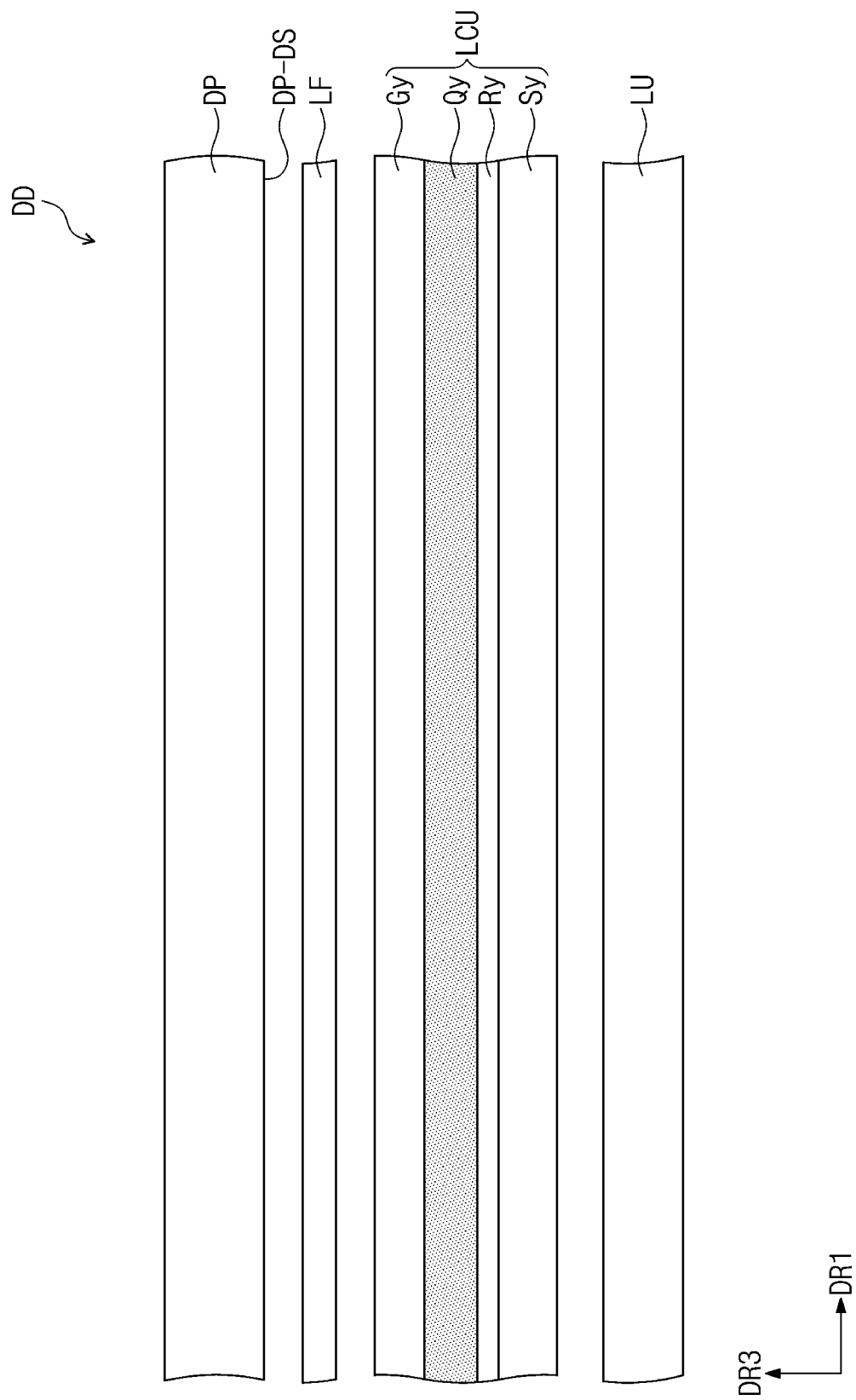

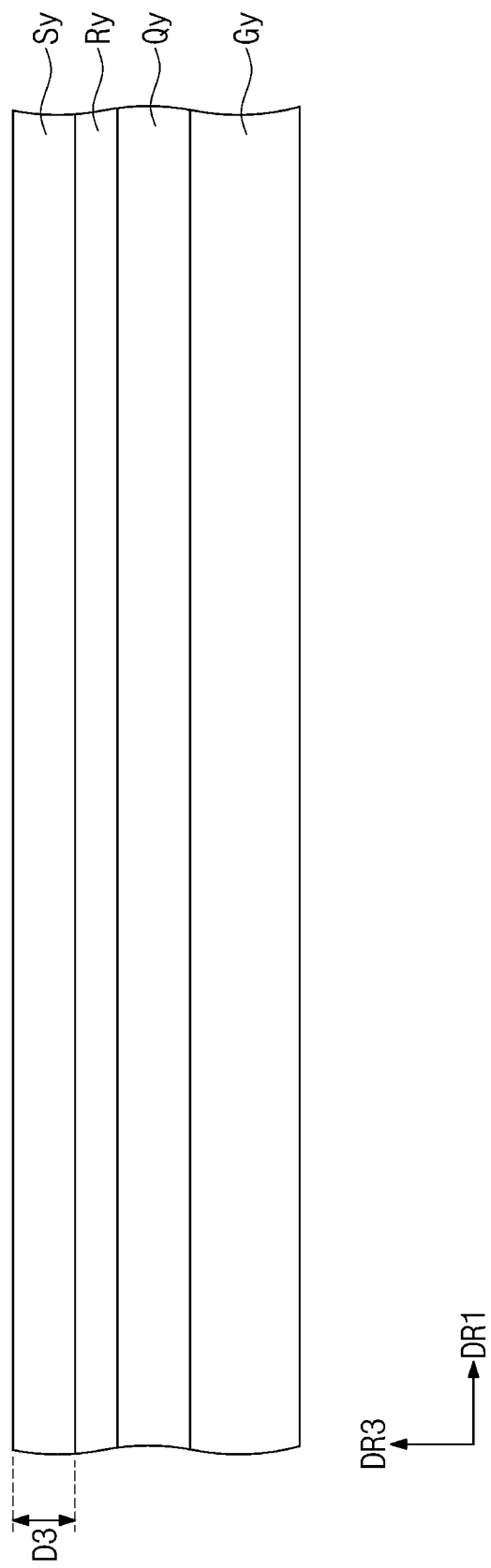

DISPLAY APPARATUS INCLUDING LIGHT CONTROL MEMBER AND METHOD OF FABRICATING THE SAME

This application claims priority to Korean Patent Application No. 10-2019-0031352 filed on Mar. 19, 2019, and all the benefits accruing therefrom under 35 U.S.C. § 119, the entire contents of which are hereby incorporated by reference.

BACKGROUND

(1) Field

The invention relate to a light control member, a display apparatus including the light control member and a method of fabricating the same.

(2) Description of the Related Art

A display apparatus has been in the spotlight as a next-generation display device because of relatively low power consumption, good portability, and high added value. The display apparatus may include a thin film transistor for turning each pixel of the display apparatus on and off.

The display apparatus may include a display panel and a light source which provides the display panel with light. The light source may include a light emitting device. The display panel may display an image based on light output from the light emitting device.

In addition, the display apparatus may include a light control member which controls light provided from the light source and emits the light toward the display panel.

SUMMARY

One more embodiment of the invention provide a display apparatus capable of reducing the thickness of a light control member which controls light released from a light source and a method of fabricating the display apparatus.

According to an embodiment of the invention, a display apparatus includes: a display panel; a light source which emits a first color light; and a light control member which receives the first color light from the light source and emits color-converted light to the display panel, the light control member including: a substrate through which the color-converted light is provided to the display panel from the light control member; a first light control layer which color-converts the first color light and outputs the color-converted light to the substrate; a second light control layer which reflects light having a different wavelength range from a wavelength range of the first color light; and a scattering layer which scatters light incident thereto. Within the light control member, the substrate, the first light control layer, the second light control layer and the scattering layer are disposed in order in a direction from the display panel to the light source.

In an embodiment, the first light control layer may be directly disposed on the substrate. The second light control layer may be directly disposed on the first light control layer.

In an embodiment, the first light control layer may include: a base resin; a first illuminant in the base resin and with which the first color light is color-converted to a second color light having a different color from the first color light; and a second illuminant in the base resin and with which the first color light is color-converted to a second color light having a different color from the second color light.

In an embodiment, the first color light may be blue, the second color light may be red, and the third color light may be green.

In an embodiment, the second light control layer may transmit the first color light. The different wavelength range may have a wavelength range of yellow color light.

In an embodiment, the first light control layer may include an organic material. The second light control layer may include an inorganic material.

In an embodiment, the scattering layer may include: a base resin including an organic material; and a scattering particle in the base resin.

In an embodiment, along a thickness direction of the display panel, the display panel may face the light source with the light control member therebetween.

In an embodiment, the light source may include: a circuit board; and a light emitting element which generates and emits the first color light and is disposed between the circuit board and the scattering layer.

In an embodiment, the display apparatus may further include an optical pattern directly disposed on the substrate and through the color-converted light from the substrate is emitted from the light control member.

In an embodiment, a refractive index of the substrate may be the same as a refractive index of the optical pattern.

In an embodiment, the optical pattern may have a lens shape.

In an embodiment, the optical pattern may have a prism shape.

In an embodiment, along a thickness direction of the substrate, a thickness of the first light control layer may be greater than a thickness of the second light control layer.

In an embodiment, along a thickness direction of the substrate, a thickness of the scattering layer may be greater than a thickness of the second light control layer.

In an embodiment, the display panel may include: a first base substrate; a second base substrate facing the first base substrate; and a liquid crystal layer between the first base substrate and the second base substrate. The display apparatus may further include an optical film between the first base substrate of the display panel and the substrate of the light control member.

According to an embodiment of the invention, a method of fabricating a display apparatus may include: providing a light control member of the display apparatus which receives first color light from a light source of the display apparatus and emits color-converted light to a display panel of the display apparatus, the light control member including: a substrate through which the color-converted light is provided to the display panel from the light control member, and disposed in order from a bottom surface of the substrate, a first light control layer which color-converts the first color light and outputs the color-converted light to the substrate, a second light control layer which reflects light having a different wavelength range from a wavelength range of the first color light, and a scattering layer which scatters light incident thereto; and providing the display panel to face the first light control layer of the light control member with the substrate thereof therebetween.

In an embodiment, each of the first light control layer and the scattering layer may include an organic material. The second light control layer may include an inorganic material. A thickness of each of the first light control layer and the scattering layer may be greater than a thickness of the second light control layer.

In an embodiment, the method may further include providing the light source facing the second light control layer of the light control member with the scattering layer thereof therebetween. The light source may include: a circuit board; and a light emitting element which generates and emits the first color light and is disposed between the circuit board and the scattering layer.

In an embodiment, the first light control layer may include: a base resin; a first illuminant in the base resin and with which the first color light is color-converted to a second color light having a different color from the first color light; and a second illuminant in the base resin and with which the first color light is color-converted to a second color light having a different color from the second color light.

BRIEF DESCRIPTION OF THE DRAWINGS

FIG. 6 illustrates an enlarged cross-sectional view showing another embodiment of a display apparatus.

FIGS. 9A to 9D illustrate cross-sectional views showing a method of fabricating a light control member and a display apparatus including the light control member.

DETAILED DESCRIPTION

Figure 1:
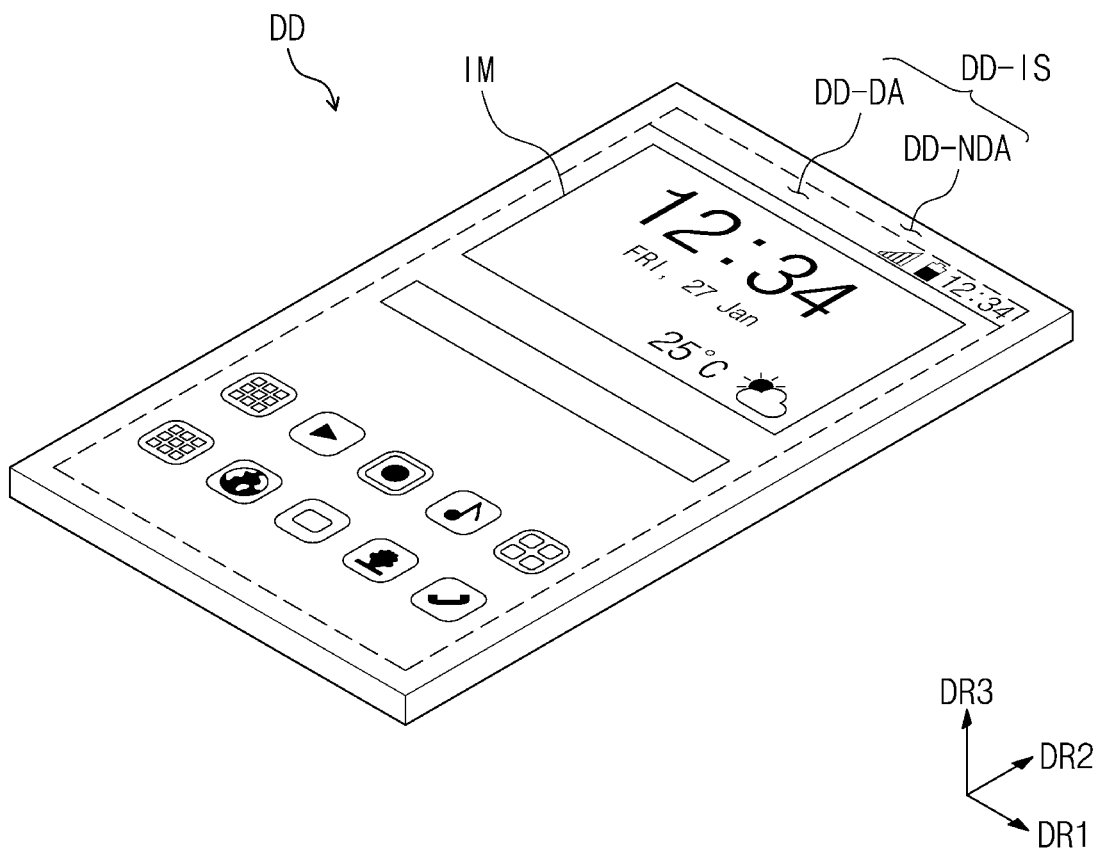
FIG. 1 illustrates a perspective view showing an embodiment of a display apparatus.

In this description, when a certain component (or region, layer, portion, etc.) is referred to as being related to another element such as being "on," "connected to" or "coupled to" other component(s), the certain component may be directly disposed on, directly connected to, or directly coupled to the other component(s) or at least one intervening component may be present therebetween. In contrast, when a certain component (or region, layer, portion, etc.) is referred to as being related to another element such as being "directly on," "directly connected to" or "directly coupled to" other component(s), no intervening component is present therebetween.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like numerals indicate like components. Moreover, in the drawings, thicknesses, ratios, and dimensions of components are exaggerated for effectively explaining the technical contents.

The terminology used herein is for the purpose of describing particular embodiments only and is not intended to be limiting. "At least one" is not to be construed as limiting "a" or "an." "Or" means "and/or." Unless the context clearly indicates otherwise, the singular forms "a," "an," and "the" are intended to include the plural forms as well. The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the invention.

In addition, the terms "beneath," "lower," "above," "upper" and the like are used herein to describe one component's relationship to other component(s) illustrated in the drawings. The relative terms are intended to encompass different orientations in addition to the orientation depicted in the drawings.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

It should be understood that the terms "comprise," "include," "have" and the like are used to specify the presence of stated features, integers, steps, operations, components, elements, or combinations thereof, but do not preclude the presence or addition of one or more other features, integers, steps, operations, components, elements, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The following will now describe embodiments of the invention in conjunction with the accompanying drawings.

Figure 2:
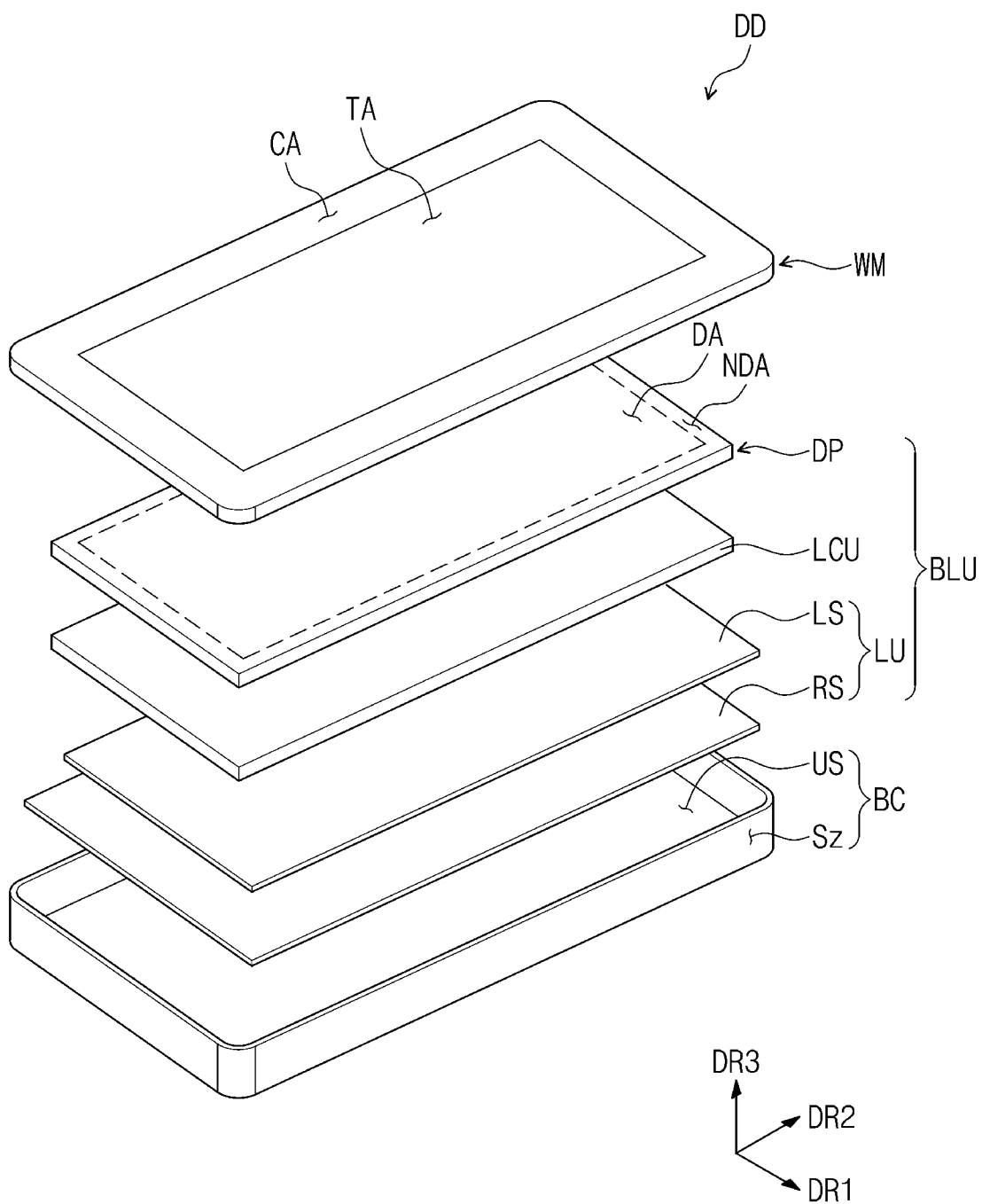
FIG. 2 illustrates an exploded perspective view of the display apparatus.
Figure 3:
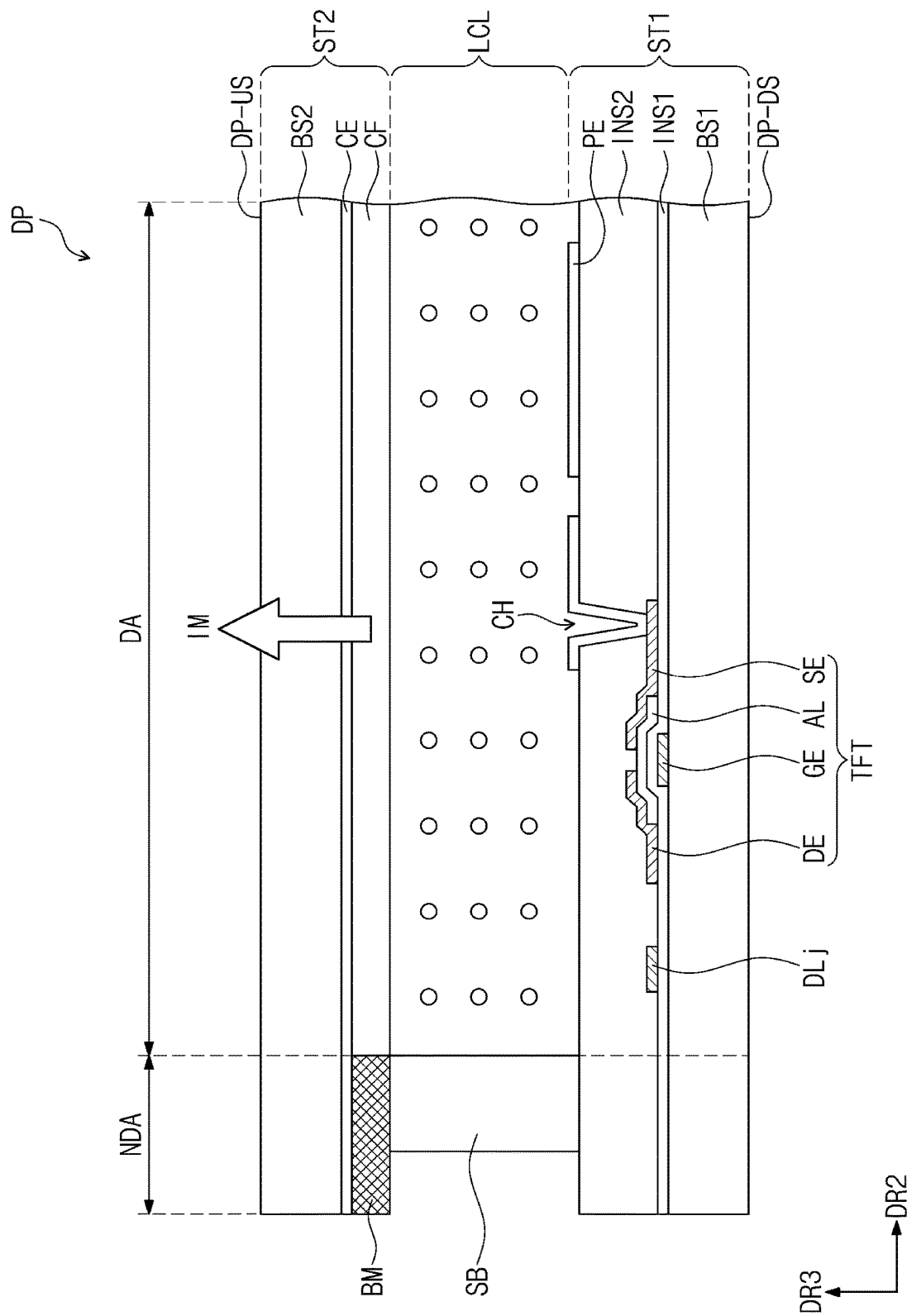
FIG. 3 illustrates an enlarged cross-sectional view showing an embodiment of a display panel.

FIG. 1 illustrates a perspective view showing an embodiment of a display apparatus DD. FIG. 2 illustrates an exploded perspective view of the display apparatus DD. FIG. 3 illustrates an enlarged cross-sectional view showing an embodiment of a display panel DP.

Referring to FIG. 1, a display apparatus DD may display an image IM at a display surface DD-IS. The display surface DD-IS may be disposed in a plane which is parallel to a plane defined by a first direction DR1 and a second direction DR2 crossing each other.

A third direction DR3 indicates a normal direction of the display surface DD-IS, or a thickness direction of the display apparatus DD. In this description, the phrase "when viewed in plan or on a plane" may mean "when viewed along the third direction DR3." The third direction DR3 differentiates a top front surface (or top surface) from a rear surface (or bottom surface) of each layer or unit which will be discussed below. However, directions indicated by the first, second, and third directions DR1, DR2, and DR3 are relative concepts, and may thus also denote respective reverse directions.

The display apparatus DD is illustrated to include a flat display surface, but the invention is not limited thereto. The display apparatus DD may include a curved display surface or a cubic display surface. The cubic display surface may include a plurality of display regions oriented in respective different directions or have a polygonal pillar-shaped display surface.

The display apparatus DD may be a rigid display device. However, the invention is not limited thereto, and in certain embodiments, the display apparatus DD may be a flexible display device. The present embodiment exemplarily illustrates the display apparatus DD capable of being applicable to a mobile phone terminal. Although not shown, a mobile phone terminal may be configured to include the display apparatus DD in a bracket/case which accommodates a mainboard on which are installed electronic modules, camera modules, power modules, and the like. The display apparatus DD according to the invention may be applicable not only to relatively large-sized electronic products such as television sets and monitors, but to relatively small and medium-sized electronic products such as tablet personal computers ("PCs"), automotive navigation systems, game consoles, and smart watches.

The display surface DD-IS may include or define a display area DD-DA on which the image IM is displayed and a non-display area DD-NDA which is adjacent to the display area DD-DA. The non-display area DD-NDA may be a region at which no image is displayed. FIG. 1 illustrates a clock window and icon images as examples of the image IM.

As shown in FIG. 1, the non-display area DD-NDA is illustrated to enclose the display area DD-DA in the top plan view. However, the invention is not limited thereto, and planar shapes of the display area DD-DA and the non-display area DD-NDA may be variously designed relative to each other. In an embodiment, for example, the non-display area DD-NDA may be disposed at one side of the display area DD-DA, or the non-display area DD-NDA may be omitted.

Referring to FIG. 2, the display apparatus DD may include a window WM, a display panel DP, a backlight unit BLU, and an accommodation member BC.

The window WM may include or be made of glass, sapphire, or plastic, and may define a display surface DD-IS at which an image IM is displayed. The window WM may include a light transmission area TA which is transparent and at which an image IM provided from the display panel DP is transmitted, and a light shield area CA which is adjacent to the light transmission area TA and at which an image IM or light does not pass. The light transmission area TA and the light shield area CA shown in FIG. 2 may respectively correspond to the display area DD-DA and the non-display area DD-NDA of the display apparatus DD shown in FIG. 1.

Along a plane defined by the first direction DR1 and the second direction DR2 which cross each other, the light transmission area TA may be disposed at a central portion of the display apparatus DD (e.g., spaced apart from an outer edge of the display apparatus DD). The light shield area CA may be disposed adjacent to the light transmission area TA, be disposed corresponding to the outer edge of the display apparatus DD and may have a frame shape surrounding the light transmission area TA. However, the invention is not limited thereto, and the light shield area CA may be adjacent to only one side of the light transmission area TA (e.g., one portion of the outer edge) or may be omitted.

The display panel DP may be disposed below the window WM. The display panel DP may generate and/or display an image, such as by using light provided from the backlight unit BLU. The display panel DP according to the invention may be provided as a liquid crystal display panel. The invention is not limited thereto, but may be applicable to various display panels.

Along a plane defined by the first direction DR1 and the second direction DR2 which cross each other, the display panel DP may include a display area DA and a non-display area NDA which is adjacent to the display area DA. The display area DA and the non-display area NDA shown in FIG. 2 may respectively overlap (e.g., correspond to) the display area DD-DA and the non-display area DD-NDA shown in FIG. 1. Similar to the non-display area DD-NDA of the display apparatus DD, the non-display area NDA of the display panel DP may be omitted.

Referring to FIG. 3, the display panel DP may include a first display substrate ST1, a second display substrate ST2, an optical control layer (e.g., a liquid crystal layer LCL) between the first and second display substrates ST1 and ST2, and a sealing member SB.

Although not shown, the first display substrate ST1 may include a plurality of signal lines such as a plurality of gate lines and a plurality of data lines which intersect the gate lines, through which an electrical signal is transmitted for controlling or driving the display panel DP. In addition, the first display substrate ST1 may include a pixel provided in plural (e.g., a plurality of pixels) respectively connected to the gate lines and the data lines. The plurality of gate lines may be connected to at least one gate driver circuit (not shown), and may be provided with gate signals from the gate driver circuit. The plurality of data lines may be connected to at least one data driver circuit (now shown), and may be provided with data voltages from the data driver circuit. Electrical signals may include, but are not limited to, a gate signal, a data voltage, a control signal, a driving signal, a timing signal, a power signal, etc.

In response to a corresponding one of the gate signals, each of the plurality of pixels may receive a corresponding one of the data voltages. Each of the plurality of pixels may display an image, emit light, etc. corresponding to the received data voltage. In addition, the plurality of pixels may be classified into a plurality of groups depending on colors displayed by the pixels.

The first display substrate ST1 may include a first base substrate BS1, a thin film transistor TFT, and a pixel electrode PE. Each of the pixels may include the thin film transistor TFT and the pixel electrode PE. The thin film transistor TFT may include a control electrode GE, a first electrode DE, and a second electrode SE.

The control electrode GE of the thin film transistor TFT may be disposed on the first base substrate BS1. The first base substrate BS1 may be a transparent or opaque dielectric substrate. In an embodiment, for example, the first base substrate BS1 may be a silicon substrate, a glass substrate, or a plastic substrate. The first base substrate BS1 may have or define a bottom surface DP-DS which corresponds to a lowermost surface of the first display substrate ST1 which faces or is closest to a light control member LCU which will be discussed below.

The first base substrate BS1 may be provided thereon with a first dielectric layer INS1 covering the control electrode GE. In this description, the phrase "A covers B" may mean "A covers B, while entirely overlapping B." The first dielectric layer INS1 may be defined as a gate dielectric layer. The first dielectric layer INS1 may be an inorganic dielectric layer including an inorganic material.

The first dielectric layer INS1 may be provided thereon with a semiconductor layer AL of the thin film transistor TFT. Although not shown, the semiconductor layer AL may include an active layer and an ohmic contact layer.

The first and second electrodes DE and SE of the thin film transistor TFT may be disposed spaced apart from each other and on the semiconductor layer AL and the first dielectric layer INS1. The semiconductor layer AL may form a conductive channel of the thin film transistor TFT which is between the first electrode DE and the second electrode SE spaced apart from each other. A data line DLj may be provided in plural (e.g., data lines DLj) on the first dielectric layer INS1. In this case, although not shown, the first base substrate BS1 may be provided thereon with a gate line that is insulated from the data line DLj by the first dielectric layer INS1.

The first dielectric layer INS1 may be provided thereon with a second dielectric layer INS2 covering the thin film transistor TFT and the data lines DLj. The second dielectric layer INS2 may be defined as a passivation layer. The second dielectric layer INS2 may be an organic dielectric layer including an organic material. The second dielectric layer INS2 may define a contact hole CH partially exposing the second electrode SE.

The second dielectric layer INS2 may be provided thereon with the pixel electrode PE overlapping or corresponding to the display area DA. A connection electrode (not shown) branched from or defined as an extended portion of the pixel electrode PE may pass through the contact hole CH and have electrical connection with the second electrode SE of the thin film transistor TFT at the contact hole CH.

The second display substrate ST2 may include a second base substrate BS2, a color filter CF, a common electrode CE, and a light shield layer BM (e.g., light shield pattern BM). In certain embodiments, the color filter CF and the common electrode CE may be disposed in the second display substrate ST2, but the invention is not limited thereto. In other embodiments, for example, the color filter CF and the common electrode CE may be included in the first display substrate ST1.

Liquid crystal molecules included in the liquid crystal layer LCL may be controlled by a difference in electric field between the common electrode CE and the pixel electrode PE. In an embodiment, for example, the display area DA may display the image IM to an outside of the display apparatus DD in accordance with the difference in electric field between the common electrode CE and the pixel electrode PE.

The second base substrate BS2 may be a transparent or opaque dielectric substrate. In an embodiment, for example, the second base substrate BS2 may be a silicon substrate, a glass substrate, or a plastic substrate. The second base substrate BS2 may have or define a top surface DP-US which corresponds to an uppermost surface of the second display substrate ST2 which faces the window WM of FIG. 2.

The second base substrate BS2 may be provided with the light shield layer BM which exposes the display area DA to outside the light shield layer BM. In an embodiment, for example, the light shield layer BM may overlap the non-display area NDA but be omitted from the display area DA. The light shield layer BM may reduce or effectively prevent light from being outwardly emitted at the non-display area NDA to outside the display apparatus DD.

The sealing member SB may overlap or correspond to the non-display area NDA and seal a space defined between the first display substrate ST1 and the second display substrate ST2 which face each other with the liquid crystal layer LCL therebetween.

Although not shown, polarization layers may be disposed on a lower portion of the first display substrate ST1 and on an upper portion of the second display substrate ST2. In an embodiment, for example, the polarization layer on the lower portion of the first display substrate ST1 may be transparent to (e.g., transmit) light that vibrates along a direction parallel to a polarization axis in a certain direction. The polarization layer on the upper portion of the second display substrate ST2 may be transparent to light that vibrates along a direction parallel to a polarization axis in a direction perpendicular to the certain direction. Alternatively, a polarization layer may be disposed between the liquid crystal layer LCL and the second base substrate BS2, instead of being disposed on the upper portion of the second display substrate ST2.

Referring back to FIG. 2, the backlight unit BLU may be disposed below the display panel DP. The backlight unit BLU may generate light and provide the display panel DP with the light. The backlight unit BLU may include a light control member LCU and a light source LU.

The light source LU may be disposed between the light control member LCU and the accommodation member BC. The light source LU may include a reflection layer RS facing the accommodation member BC, and a light emitting layer LS disposed on the reflection layer RS and facing the light control member LCU. In certain embodiments, the light emitting layer LS may emit a blue light. In this description, the blue light is referred to hereinafter a first color light.

The light emitting layer LS may include a plurality of light emitting elements each of which generates the first color light. The reflection layer RS may reflect the first color light transferred from the light emitting layer LS toward the display panel DP. The reflection layer RS may include a material that reflects light, and may entirely overlap the light emitting layer LS. In certain embodiments, the reflection layer RS may include aluminum or silver. In an embodiment, for example, the reflection layer RS may be provided in the form of a reflective sheet.

The light control member LCU may be disposed between the display panel DP and the light source LU. The light control member LCU may control properties of the first color light transferred from the light source LU. In an embodiment, for example, the light control member LCU may convert the first color light into light whose color is different from that of the first color light, or may reflect light of a certain wavelength range. The light control member LCU may also be referred to a color-converting layer LCU or a wavelength-converting member LCU.

The accommodation member BC may be disposed at the bottom of the display apparatus DD, and may receive the backlight unit BLU therein. The accommodation member BC may include a bottom portion US and a sidewall portion Sz provided in plural (e.g., a plurality of sidewall portions Sz) each connected to the bottom portion US. The light source LU, the light control member LCU, and the display panel DP may be sequentially stacked on the bottom portion US of the accommodation member BC.

Figure 4:
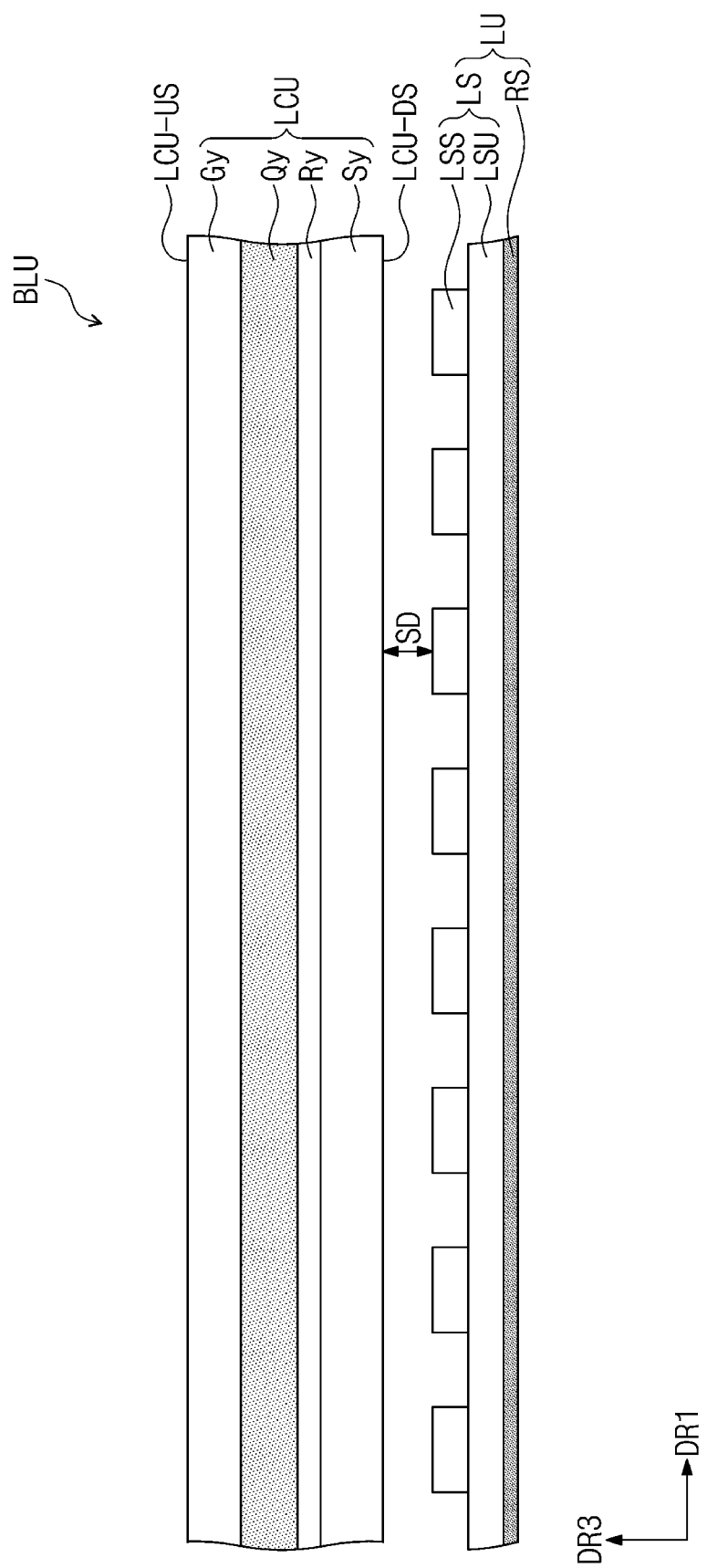
FIG. 4 illustrates an enlarged cross-sectional view showing an embodiment of a backlight unit.
Figure 5A:
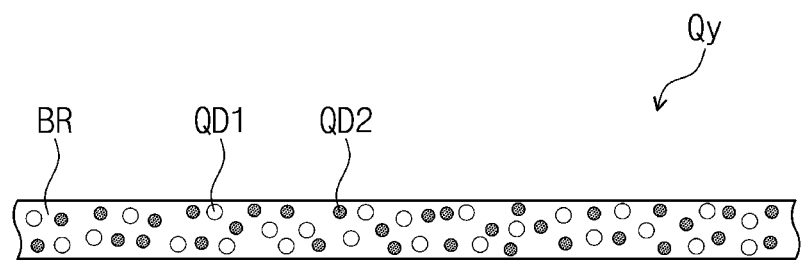
FIG. 5A illustrates an enlarged cross-sectional view showing an embodiment of a first light control layer shown in FIG. 4.
Figure 5B:
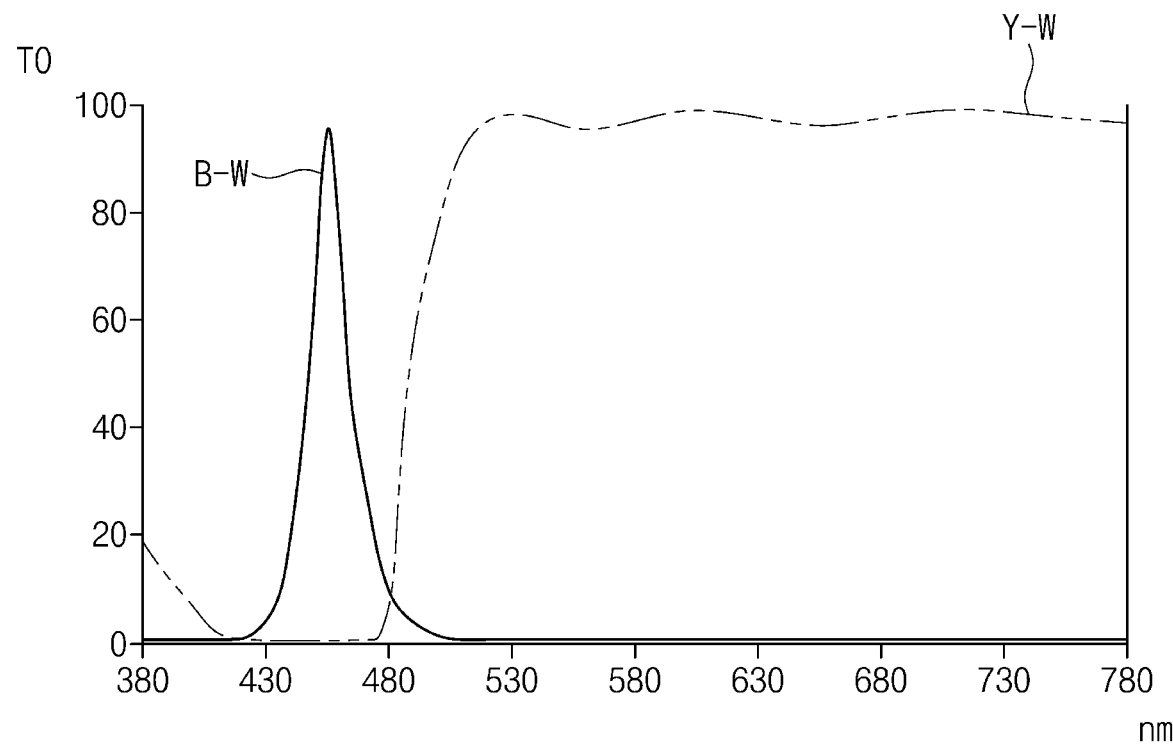
FIG. 5B illustrates a graph showing an embodiment of wavelengths of a first color light.
Figure 5C:
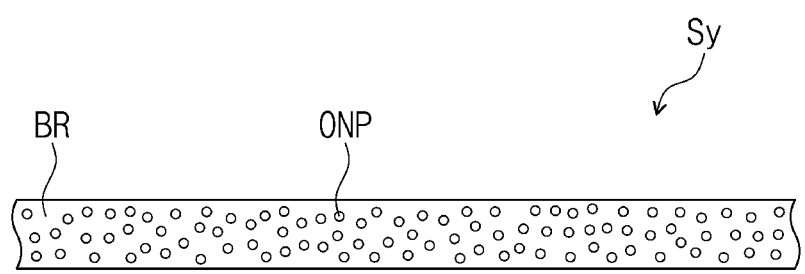
FIG. 5C illustrates an enlarged cross-sectional view showing an embodiment of a scattering layer shown in FIG. 4.

FIG. 4 illustrates an enlarged cross-sectional view showing an embodiment of a backlight unit. FIG. 5A illustrates an enlarged cross-sectional view showing an embodiment of a first light control layer shown in FIG. 4. FIG. 5B is a graph showing an embodiment of wavelengths of a first color light. FIG. 5C illustrates an enlarged cross-sectional view showing an embodiment of a scattering layer shown in FIG. 4.

Referring to FIG. 4, the light emitting layer LS of the light source LU may include a circuit board LSU and a light emitting element LSS provided in plural (e.g., a plurality of light emitting elements LSS) which are disposed on the circuit board LSU. The light emitting elements LS S may be arranged spaced apart from each other along the circuit board LSU. As discussed with reference to FIG. 2, each of the light emitting elements LSS may emit the first color light, or the blue light.

The light emitting elements LSS may include a light emitting diode ("LED") provided in plural (e.g., a plurality of light emitting diodes ("LEDs")) each of which is provided as a point light source. The type of light emitting elements LSS, however, is not limited thereto. A single LED or a plurality of LED groups may be provided as a point light source to constitute the light emitting elements LSS.

The circuit board LSU may be disposed on the reflection layer RS, and may have the light emitting elements LSS mounted thereon. The circuit board LSU may overlap or correspond to each of the light control member LCU and the display panel DP of FIG. 2. In an embodiment, for example, the light emitting elements LSS mounted on the circuit board LSU may overlap or correspond to each of the light control member LCU and the display panel DP, and may emit the first color light toward the light control member LCU.

The circuit board LSU may include a light source controller (not shown) connected to the light emitting elements LSS. The light source controller (not shown) may analyze an image IM which will be displayed on the display panel DP and output a local dimming signal, and further in response to the local dimming signal, may control luminance of light produced from the light emitting elements LSS to display an image IM.

The light control member LCU may include a substrate Gy, a first light control layer Qy, a second light control layer Ry, and a scattering layer Sy. The light control member LCU may have or define a top surface LCU-US facing the display panel DP and a bottom surface LCU-DS facing the light source LU.

The substrate Gy may face the display panel DP. In an embodiment, for example, the substrate Gy may be a silicon substrate, a glass substrate, a plastic substrate, or any other substrate including one or more various materials. The substrate Gy may have or define a top surface (e.g., emission surface) that corresponds to or defines the top surface LCU-US of the light control member LCU facing the display panel DP.

The first light control layer Qy may be provided between the second light control layer Ry and a bottom surface of the substrate Gy. In an embodiment, for example, the first light control layer Qy may be directly disposed on the bottom surface of the substrate Gy. In this description, the phrase "A is directly disposed on B" may mean "no adhesive layer is disposed between A and B, and A is directly formed on B."

In certain embodiments, the first color light generated from the light source LU and incident to the first light control layer Qy may be color-converted and emitted as a different color light from the first light control layer Qy. The first light control layer Qy may absorb the first color light and emit a white light. As a result, the display panel DP may receive the white light emitted from the first light control layer Qy.

As shown in FIG. 5A, the first light control layer Qy may convert a wavelength range of light incident thereon to a different wavelength (e.g., wavelength-convert light). The first light control layer Qy may include a base resin BR, a first illuminant QD1 provided in plural (e.g., a plurality of first illuminants QD1) distributed in the base resin BR, and a second illuminant QD2 provided in plural (e.g., a plurality of second illuminants QD2) distributed in the base resin BR. The base resin BR may form an outer surface of the first light control layer Qy.

The base resin BR may include or be made of a polymer resin composition. In an embodiment, for example, the polymer resin composition constituting the base resin BR may include an organic material, such as an acryl-based resin, a urethane-based resin, a silicon-based resin, or an epoxy-based resin. The polymer resin composition may be transparent.

Each of the first illuminant QD1 and the second illuminant QD2 may absorb at least a portion of light incident thereto, and then may emit or transmit light having a specific color (e.g., color convert light). In this description, the first illuminants QD1 and the second illuminants QD2 may be collectively called illuminants QD1 and QD2. The first illuminants QD1 may emit a second color light which is color-converted from the first color light transferred from the light source LU and whose color is different from that of the first color light. The second illuminants QD may emit a third color light which is color-converted from the first color light transferred from the light source LU may and whose color is different from that of the second color light. In an embodiment, for example, the second color light may be a red light, and the third color light may be a green light.

In certain embodiments, the illuminants QD1 and QD2 included in the first light control layer Qy may include phosphors and/or quantum dots.

In certain embodiments, the phosphor employed as the illuminants QD1 and QD2 may be an inorganic phosphor. In an embodiment, for example, the phosphor employed as the illuminants QD1 and QD2 may be a green phosphor or a red phosphor. The phosphor used for the first light control layer Qy is not limited to the material discussed above, but other phosphor materials may be utilized.

In other embodiments, a quantum dot may be employed as the illuminants QD1 and QD2 included in the first light control layer Qy. The quantum dot may be selected from a II-VI group compound, a III-V group compound, IV-VI group compound, a IV group element, a IV group compound, and a combination thereof.

The II-VI group compound may include one or more of a binary compound selected from CdSe, CdTe, ZnS, ZnSe, ZnTe, ZnO, HgS, HgSe, HgTe, MgSe, MgS, and a combination thereof; a ternary compound selected from AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The III-V group compound may include one or more of a binary compound selected from GaN, GaP, GaAs, GaSb, AlN, AlP, AlAs, AlSb, InN, InP, InAs, InSb, and a combination thereof; a ternary compound selected from GaNP, GaNAs, GaNSb, GaPAs, GaPSb, AlNP, ANAs, AlNSb, AlPAs, AlPSb, InGaP, InNP, InNAs, InNSb, InPAs, InPSb, GaAlNP, and a combination thereof; and a quaternary compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The IV-VI group compound may include one or more of a binary compound selected from SnS, SnSe, SnTe, PbS, PbSe, PbTe, and a combination thereof; a ternary compound selected from SnSeS, SnSeTe, SnSTe, PbSeS, PbSeTe, PbSTe, SnPbS, SnPbSe, SnPbTe, and a combination thereof; and a quaternary compound selected from SnPbSSe, SnPbSeTe, SnPbSTe, and a combination thereof. The IV group element may include Si, Ge, or a combination thereof. The IV group compound may include a binary compound selected from SiC, SiGe, and a combination thereof.

One of the binary, ternary, and quaternary compounds may be present at a uniform concentration in a particle, or may be present to have divided states at partially different concentrations in the same particle. The illuminants QD1 and QD2 may have a core-shell structure in which one quantum dot encloses another quantum dot. An interface between the core and the shell may have a concentration gradient such that a concentration of an element present in the shell may decrease as approaching a center of the core.

In certain embodiments, the quantum dot may have a core-shell structure in which a shell encloses a nano-crystalline core. The shell of the quantum dot may serve as a protective layer that reduces or effectively prevents chemical degeneration of the core to thereby maintain semiconductor characteristics and/or as a charging layer that provides the quantum dot with electrophoresis properties. The shell may be a single layer or a multiple layer. An interface between the core and the shell may have a concentration gradient such that a concentration of an element present in the shell may decreases as approaching a center of the core. The shell of the quantum dot may be, for example, metal oxide, non-metal oxide, a semiconductor compound, or a combination thereof.

The metal oxide or non-metal oxide may include a binary compound such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, and NiO, or a ternary compound such as $MgAl_2O_4$, $CoFe_2O_4$, $NiFe_2O_4$, and $CoMn_2O_4$, but the invention is not limited thereto.

The semiconductor compound may include CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, or a combination thereof, but the invention is not limited thereto.

The quantum dot may have a full width of half maximum ("FWHM") of a light emitting wavelength spectrum. The FWHM may be within a range of less than about 45 nanometers (nm), less than about 40 nm, or less than about 30 nm, such that color purity and/or color reproducibility may be improved. In addition, light released through such quantum dot may be emitted in all directions, which may result in a relatively wide view angle.

The quantum dot may have a shape generally used in the art, but the invention is not limited thereto. In an embodiment, for example, the quantum dot may have a shape of sphere, pyramid, multi-arm, cubic nano-particle, nano-tube, nano-wire, nano-fiber, or nano-plate particle.

The quantum dot may adjust a color of light emitted therefrom depending on a particle size thereof, and thus may have various luminous colors such as blue, red, and green. When the first illuminants QD1 and the second illuminants QD2 are quantum dots, the first illuminant QD1 may have a particle size different from that of the second illuminant QD2. In an embodiment, for example, the particle size of the first illuminant QD1 may be greater than that of the second illuminant QD2. In this case, the first illuminant QD1 may emit light whose wavelength is greater than a wavelength of light emitted from the second illuminant QD2.

Referring back to FIG. 4, the second light control layer Ry may be provided on a bottom surface of the first light control layer Qy. In an embodiment, for example, the second light control layer Ry may be directly disposed on the bottom surface of the first light control layer Qy. The second light control layer Ry may allow the first color light to pass therethrough, and may reflect light whose wavelength range is different from that of the first color light.

Referring to FIG. 5B, a horizontal axis indicates a wavelength (nm), and a vertical axis denotes relative transmittance (TO). As shown in FIG. 5B, the first color light indicated by B-W may be emitted and have a wavelength range of about 400 nm to about 500 nm. According to one or more embodiment of the invention, the second light control layer Ry may reflect light having a wavelength range of yellow light, and may transmit the first color light B-W whose wavelength range correspond to the blue light.

In an embodiment, for example, the white light emitted from the first light control layer Qy may not be all transferred to the display panel DP, but rather a portion of the white light may be delivered to the second light control layer Ry. In this case, the second light control layer Ry may transmit light whose wavelength range corresponds to that of the first color light, and may reflect, toward the display panel DP, light whose wavelength range is different from that of the first color light. Therefore, it may be possible to increase luminance efficiency of light provided to the display panel DP.

The second light control layer Ry according to the invention may be directly disposed on the base resin BR of the first light control layer Qy, and thus the base resin BR may be protected. In certain embodiments, the second light control layer Ry may include or be formed of an inorganic material. In an embodiment, for example, the second light control layer Ry may include at least one inorganic material selected from silicon oxide, magnesium fluoride, zinc oxide, titanium oxide, zirconium oxide, niobium oxide, tantalum oxide, tin oxide, nickel oxide, silicon nitride, indium nitride, and gallium nitride.

The scattering layer Sy may face the light source LU and be disposed on the second light control layer Ry. In an embodiment, for example, the scattering layer Sy may be directly disposed on the second light control layer Ry, and may protect the first light control layer Qy and the second light control layer Ry. The scattering layer Sy may have a bottom surface that corresponds to or defines the bottom surface LCU-DS of the light control member LCU facing the light source LU.

The scattering layer Sy may scatter the first color light emitted from the light source LU, and transfer the scattered first color light to the first light control layer Qy. As discussed above with reference to FIG. 5B, the first color light scattered and emitted from the scattering layer Sy may pass through the second light control layer Ry and then travel to the first light control layer Qy.

As shown in FIG. 5C, the scattering layer Sy may include a base resin BR and a scattering particle ONP provided in plural (e.g., scattering particles ONP) within the base resin BR. The base resin BR included in the scattering layer Sy may be substantially the same as the base resin BR included in the first light control layer Qy. In an embodiment, for example, the base resin BR may include or be made of a polymer resin composition. The polymer resin composition constituting the base resin BR may include an organic material, such as an acryl-based resin, a urethane-based resin, a silicon-based resin, or an epoxy-based resin. The polymer resin composition may be transparent.

The scattering particles ONP may be inorganic particles. In an embodiment, for example, the scattering particles ONP may include one or more of $TiO_2$, ZnO, $Al_2O_3$, $SiO_2$, and hollow silica. The scattering particles ONP may be one of $TiO_2$, ZnO, $Al_2O_3$, $SiO_2$, and hollow silica, or a combination including at least two thereof.

As discussed above, the light control member LCU may have a structure in which the first light control layer Qy, the second light control layer Ry, and the scattering layer Sy are sequentially stacked on the substrate Gy facing the display panel DP.

When a conventional light control member has a substrate Gy facing a light source LU, the conventional light control member may have a structure in which a scattering layer Sy, a second light control layer Ry, and a first light control layer Qy are stacked on the substrate Gy such that a major surface of the first light control layer Qy is exposed to outside the conventional light control member. In this case, an inorganic layer and an organic layer are additionally stacked within the conventional light control member to protect at least the major surface of the first light control layer Qy.

In contrast, according to one or more embodiment of the invention, the second light control layer Ry may include an inorganic material, and the scattering layer Sy may include an organic material, with the result that the first light control layer Qy may be protected by the stacked structure of the second light control layer Ry and the scattering layer Sy.

In an embodiment, for example, the scattering layer Sy including an organic material may directly contact the light source LU. Direct contact of the scattering layer Sy with the light source LU may protect the second light control layer Ry from damage caused by friction between the second light control layer Ry and the light source LU. Accordingly, neither inorganic nor organic layers of the conventional light source member may be additionally provided to reduce a total thickness of the light control member LCU in one or more embodiment of the invention.

In another embodiment, referring to FIG. 4, the light control member LCU may be spaced apart from the light source LU at an interval SD along the third direction DR3. In this case, although not shown, the light control member LCU and the light source LU may be provided therebetween with at least one supporter that maintains separation of the light control member LCU from the light source LU and thereby maintain the interval SD. Further, the scattering layer Sy including an organic material may protect the second light control layer Ry from damage caused by friction between the second light control layer Ry and the supporter.

FIG. 6 illustrates an enlarged cross-sectional view showing another embodiment of a display apparatus.

Referring to FIG. 6, the display apparatus DD may further include an optical film LF between the display panel DP and the light control member LCU. A top surface of the optical film LF may face the display panel DP, and a bottom surface of the optical film LF may face the light control member LCU.

The optical film LF may include a diffusion sheet that diffuses light delivered from the light control member LCU. The optical film LF may include a prism sheet that concentrates light. The invention, however, is not limited thereto. In an embodiment, for example, the optical film LF may include a plurality of sheets such as both of the diffusion sheet and the prism sheet described above.

Figure 7:
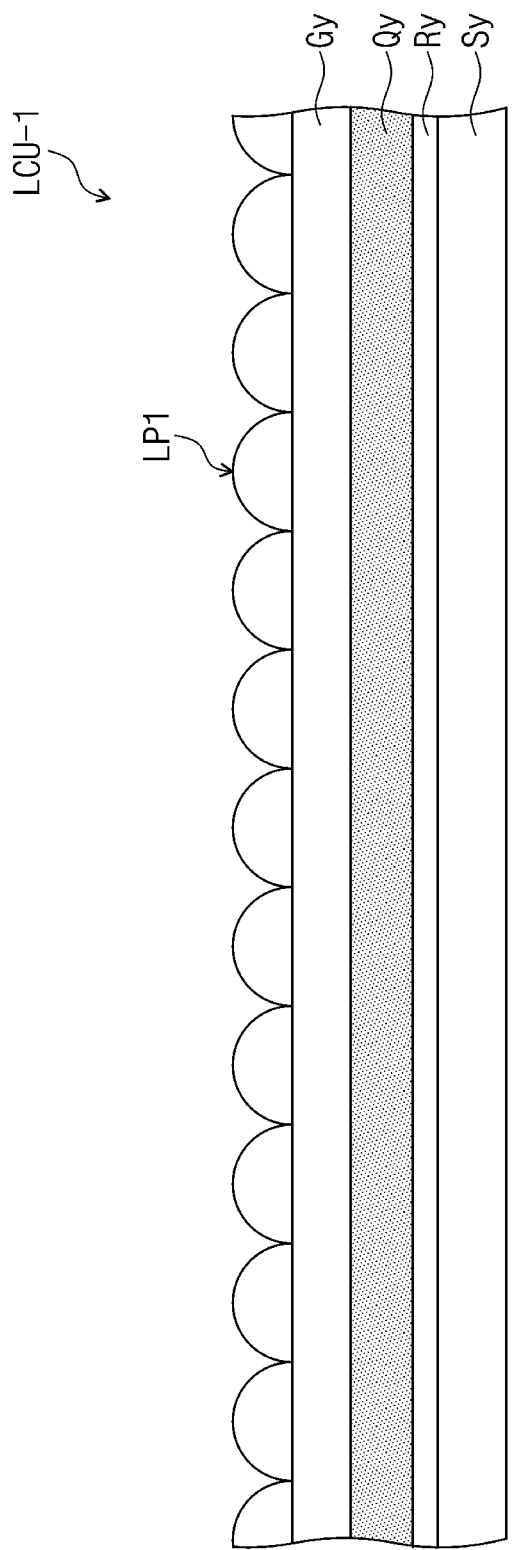
FIG. 7 illustrates an enlarged cross-sectional view showing another embodiment of a light control member.
Figure 8:
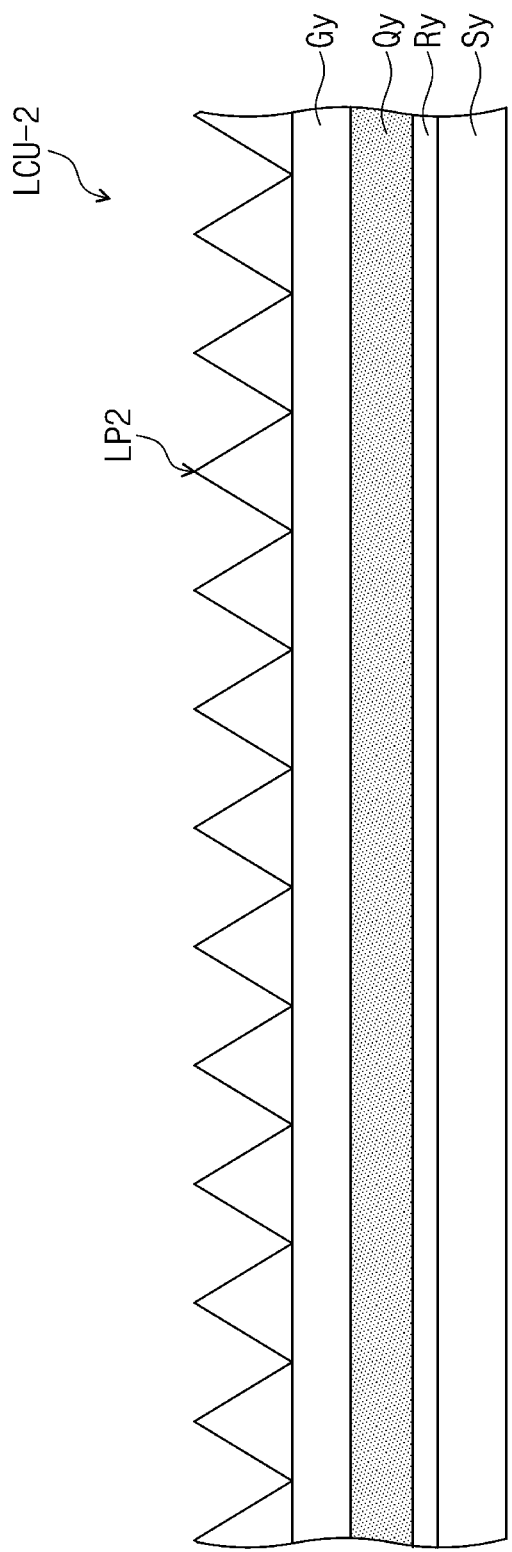
FIG. 8 illustrates an enlarged cross-sectional view showing a modified embodiment of a light control member.

FIG. 7 illustrates an enlarged cross-sectional view showing another embodiment of a light control member. FIG. 8 illustrates an enlarged cross-sectional view showing a modified embodiment of a light control member.

A light control member LCU-1 depicted in FIG. 7 and a light control member LCU-2 depicted in FIG. 8 may further include an optical pattern on the substrate Gy, where other components and layers may be substantially the same as those of the light control member LCU illustrated in FIG. 4. In the embodiments that follow, optical patterns additionally provided will be mainly discussed with reference to FIGS. 7 and 8, and repeated explanations of other components will be omitted.

Referring to FIG. 7, a light control member LCU-1 may further include a first optical pattern LP1 provided in plural (e.g., first optical patterns LP1) along the top surface of the substrate Gy. The first optical patterns LP1 may each have a lens shape, and may be extended from the top surface of the substrate Gy. As shown in FIG. 7, when viewed in cross section, each of the first optical patterns LP1 may have a semicircular shape and face the display panel DP.

In certain embodiments, each of the first optical patterns LP1 may have a refractive index substantially the same as a refractive index of the substrate Gy. Since the substrate Gy and the first optical patterns LP1 have the same refractive index, total reflection of light emitted from the first light control layer Qy at interfaces between the substrate Gy and the first optical patterns LP1 may be reduced or effectively prevented. In an embodiment, for example, light emitted from the first light control layer Qy may pass through the substrate Gy and the first optical patterns LP1 and then emit outwardly from the light control member LCU-1 through outer surfaces of the first optical patterns LP1. That is, the first optical patterns LP1 may define an emission surface of the light control member LCU-1.

Referring to FIG. 8, a light control member LCU-2 may further include a second optical pattern LP2 provided in plural (e.g., second optical patterns LP2) along the top surface of the substrate Gy. The second optical patterns LP2 may each have a prism shape, and may extend from the top surface of the substrate Gy. As shown in FIG. 8, when viewed in cross section, each of the second optical patterns LP2 may have a triangular shape and face the display panel DP.

Likewise the first optical patterns LP1, each of the second optical patterns LP2 may have a refractive index substantially the same as a refractive index of the substrate Gy. Since the substrate Gy and the second optical patterns LP2 have the same refractive index, total reflection of light emitted from the first light control layer Qy at interfaces between the substrate Gy and the second optical patterns LP2 may be reduced or effectively prevented.

FIGS. 9A to 9D illustrate cross-sectional views showing an embodiment of a method of fabricating a light control member LCU of a display apparatus DD.

FIGS. 9A to 9D show a method of fabricating the light control member LCU illustrated in FIG. 4. However, the light control members LCU-1 and LCU-2 depicted in FIGS. 7 and 8 may also be manufactured by employing the fabrication method illustrated in FIGS. 9A to 9D.

Figure 9A:
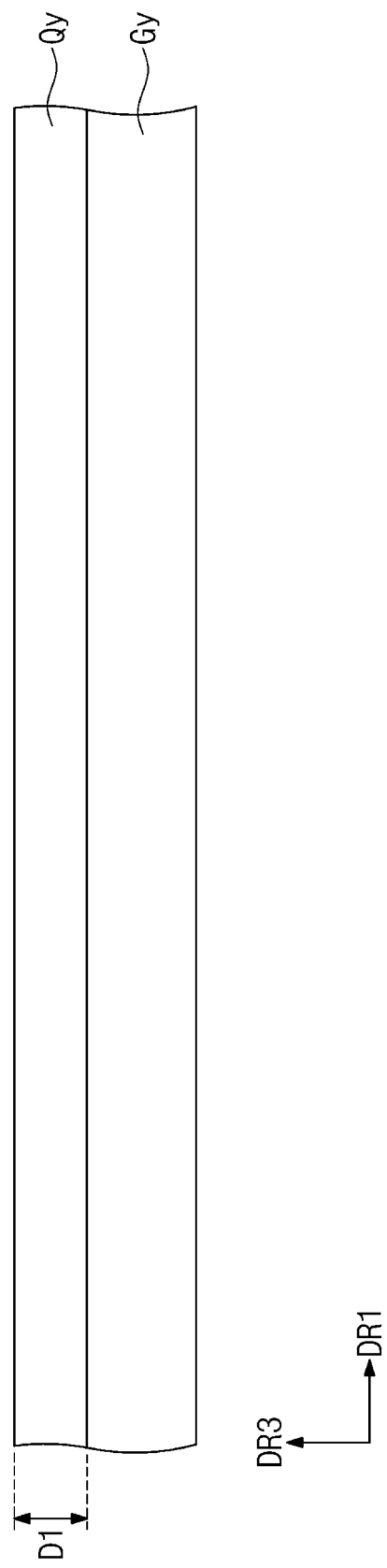

Referring to FIG. 9A, a first light control layer Qy may be provided or formed on a substrate Gy. As discussed above, a top surface of the substrate Gy may face (e.g., be closest to) the display panel DP of FIG. 2, and the first light control layer Qy may be provided or formed on a bottom surface of the substrate Gy. The first light control layer Qy may include an organic material, and may have a flat bottom surface. The first light control layer Qy may have a thickness corresponding to a first distance D1 along a third direction DR3 or along a thickness direction of the substrate Gy.

Figure 9B:
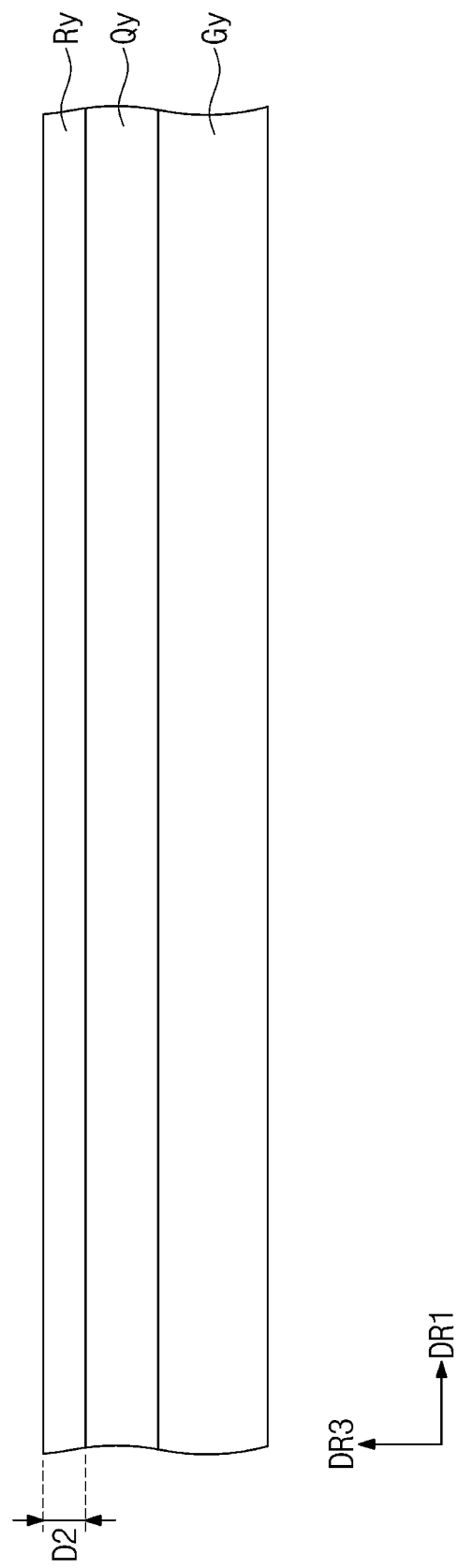

Referring to FIG. 9B, the second light control layer Ry may be provided or formed on the flat bottom surface of the first light control layer Qy. The second light control layer Ry may include an inorganic material, and may have a thickness corresponding to a second distance D2 along the third direction DR3. In certain embodiments, the first distance D1 may be greater than the second distance D2. In an embodiment, for example, the thickness of the first light control layer Qy including an organic material may be greater than that of the second light control layer Ry including an inorganic material.

Referring to FIG. 9C, a scattering layer Sy may be provided or formed on a bottom surface of the second light control layer Ry. The scattering layer Sy may include an organic material, and may have a thickness corresponding to a third distance D3 along the third direction DR3. In certain embodiments, the third distance D3 may be greater than the second distance D2. In an embodiment, for example, the thickness of the scattering layer Sy including an organic material may be greater than that of the second light control layer Ry including an inorganic material. The scattering layer Sy may have a flat bottom surface.

Figure 9D:
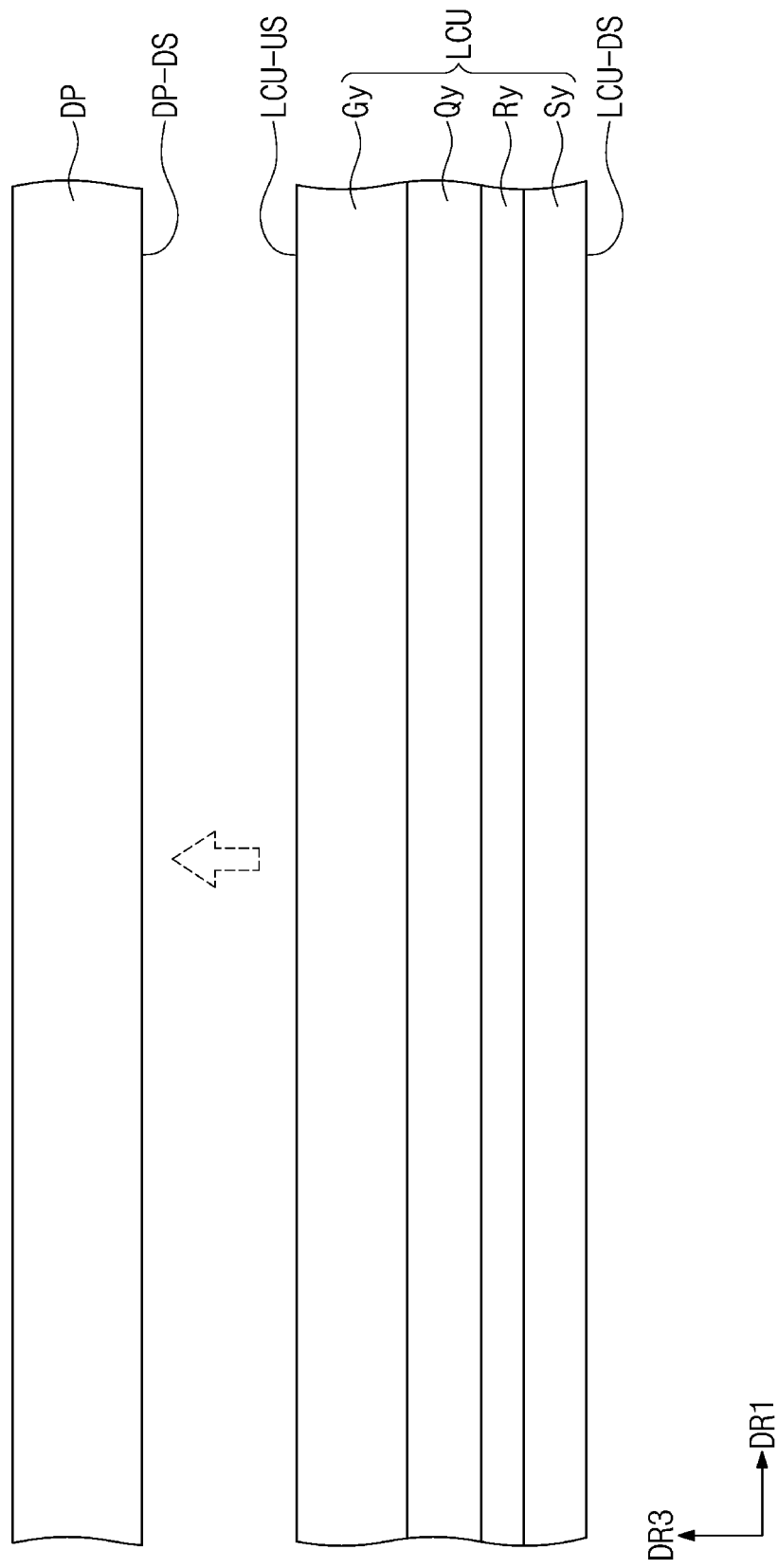

Referring to FIG. 9D, the substrate Gy of a light control member LCU which is fabricated as described above, may be aligned to face the display panel DP. In a method of manufacturing a display apparatus DD, the top surface of the substrate Gy may be provided on a bottom surface DP-DS of the display panel DP. In an embodiment, for example, the top surface of the substrate Gy may be directly disposed on the bottom surface DP-DS of the display panel DP. As another embodiment, the top surface of the substrate Gy may be spaced apart at a certain interval SD from the bottom surface DP-DS of the display panel DP. In this case, the optical film LF shown in FIG. 6 may be disposed between the light control member LCU and the display panel DP which are spaced apart from each other.

According to one or more embodiment of the invention, a first light control layer, a second light control layer, and a scattering layer may be sequentially stacked in order from a substrate of a light control member. Among layers of the light control member, the substrate of the light control member may be disposed closest to a display panel.

In particular, the second light control may include an inorganic material, and the scattering layer may include an organic material, with the result that the first light control layer may be protected from an environment (e.g., moisture and/or oxygen) outside of the light control member. Accordingly, an additional inorganic layer or organic layer may be omitted to minimize a total thickness of the light control member.

Embodiments have been described in the specification and drawings. Although specific terms are used herein, they are merely used for the purpose of describing the invention rather than limiting technical meanings or scope of the invention disclosed in the claims. Therefore, it will be appreciated by a person of ordinary skill in the art that various modifications and equivalent embodiments can be made from the invention. In conclusion, the authentic technical scope of the invention to be protected shall be determined by the technical concept of the accompanying claims.

What is claimed is:

1. A display apparatus, comprising:
a light source which emits a first color light; and
a light control member which receives the first color light from the light source and emits color-converted light, the light control member comprising:
a first light control layer which color-converts the first color light and outputs the color-converted light;
both an inorganic layer and an organic layer between the light source and the first light control layer; and
among the inorganic layer and the organic layer between the light source and the first light control layer, in order along a thickness direction from the first light control layer to the light source:
the inorganic layer defined by a second light control layer which reflects light having a different wavelength range from a wavelength range of the first color light; and
the organic layer defined by an organic scattering layer which scatters light incident thereto and is directly disposed on the second light control layer.

2. The display apparatus of claim 1, wherein within the light control member, the second light control layer is directly disposed on the first light control layer.

3. The display apparatus of claim 1, wherein within the light control member, the first light control layer includes:
a base resin;
a first illuminant in the base resin and with which the first color light is color-converted to a second color light having a different color from the first color light; and
a second illuminant in the base resin and with which the first color light is color-converted to a third color light having a different color from the second color light.

4. The display apparatus of claim 3, wherein the first color light is blue, the second color light is red, and the third color light is green.

5. The display apparatus of claim 1, wherein
the second light control layer within the light control member transmits the first color light, and
the different wavelength range has a wavelength range of yellow color light.

6. The display apparatus of claim 1, wherein within the light control member
the first light control layer includes an organic material.

7. The display apparatus of claim 6, wherein the organic scattering layer within the light control member includes:
a base resin including an organic material; and
a scattering particle in the base resin including the organic material.

8. The display apparatus of claim 1, further comprising a display panel,
wherein along the thickness direction, the display panel faces the light source with the light control member therebetween, and the light control member emits the color-converted light to the display panel.

9. The display apparatus of claim 8, wherein the light source includes:
 a circuit board; and
 a light emitting element which generates and emits the first color light and is disposed between the circuit board and the organic scattering layer.

10. The display apparatus of claim 8, wherein the light control member further comprises:
 a substrate through which the color-converted light is provided to the display panel from the light control member, and
 an optical pattern directly disposed on the substrate and through the color-converted light from the substrate is emitted from the light control member.

11. The display apparatus of claim 10, wherein within the light control member, a refractive index of the substrate is the same as a refractive index of the optical pattern.

12. The display apparatus of claim 10, wherein the optical pattern has a lens shape.

13. The display apparatus of claim 10, wherein the optical pattern has a prism shape.

14. The display apparatus of claim 8, wherein the display panel includes:
 a first base substrate
 a second base substrate facing the first base substrate; and
 a liquid crystal layer between the first base substrate and the second base substrate, and
 further comprising an optical film between the first base substrate of the display panel and the light control member.

15. The display apparatus of claim 1, wherein within the light control member, along the thickness direction, a thickness of the first light control layer is greater than a thickness of the second light control layer.

16. The display apparatus of claim 1, wherein, within the light control member, along the thickness direction, a thickness of the organic scattering layer is greater than a thickness of the second light control layer.

17. A method of fabricating a display apparatus, the method comprising:
 providing a light control member of the display apparatus which receives first color light from a light source of the display apparatus and emits color-converted light to a display panel of the display apparatus, the light control member comprising:

a first light control layer which color-converts the first color light and outputs the color-converted light to the substrate, both an inorganic layer and an organic layer between the light source and the first light control layer, and among the inorganic layer and the organic layer between the light source and the first light control layer, in order along a thickness direction from the first light control layer to the light source:
 the inorganic layer defined by a second light control layer which reflects light having a different wavelength range from a wavelength range of the first color light, and
 the organic layer defined by an organic scattering layer which scatters light incident thereto and is directly disposed on the second light control layer; and providing the light control member between the display panel and the light source to dispose the organic scattering layer of the light control member closer to the light source than the first light control layer which color-converts the first color light.

18. The method of claim 17, wherein within the light control member:
 the first light control layer includes an organic material, and
 a thickness of each of the first light control layer and the organic scattering layer is greater than a thickness of the second light control layer.

19. The method of claim 17, further comprising providing the light source facing the second light control layer of the light control member with the organic scattering layer thereof therebetween,
 wherein the light source includes:
 a circuit board; and
 a light emitting element which generates and emits the first color light and is disposed between the circuit board and the organic scattering layer.

20. The method of claim 17, wherein the first light control layer within the light control member includes:
 a base resin;
 a first illuminant in the base resin and with which the first color light is color-converted to a second color light having a different color from the first color light; and
 a second illuminant in the base resin and with which the first color light is color-converted to a third color light having a different color from the second color light.

* * * * *